US012109582B2

(12) United States Patent
Balestrini et al.

(10) Patent No.: US 12,109,582 B2
(45) Date of Patent: Oct. 8, 2024

(54) FOG-GENERATING SYSTEM EQUIPPED WITH SAFETY AND REGULATING DEVICES OF THE FLOW-RATE OF ITS FOG-GENERATING FLUID

(71) Applicant: UR FOG S.R.L., Turin (IT)

(72) Inventors: Giovanni Balestrini, Turin (IT); Mauro Lombardo, Turin (IT); Marco Zangirolami, Turin (IT)

( * ) Notice: Subject to any disclaimer, the term of this patent is extended or adjusted under 35 U.S.C. 154(b) by 569 days.

(21) Appl. No.: 17/612,662

(22) PCT Filed: Apr. 22, 2020

(86) PCT No.: PCT/IT2020/050101
§ 371 (c)(1),
(2) Date: Nov. 19, 2021

(87) PCT Pub. No.: WO2020/250254
PCT Pub. Date: Dec. 17, 2020

(65) Prior Publication Data

US 2022/0219180 A1 Jul. 14, 2022

(30) Foreign Application Priority Data

Jun. 14, 2019 (IT) ........................ 102019000008868

(51) Int. Cl.

| | |
|---|---|
| ***B05B 9/00*** | (2006.01) |
| ***B05B 9/04*** | (2006.01) |
| ***B05B 12/08*** | (2006.01) |
| *A63J 5/02* | (2006.01) |
| *F41H 9/06* | (2006.01) |
| *G08B 15/02* | (2006.01) |

(52) U.S. Cl.
CPC ............ *B05B 9/002* (2013.01); *B05B 9/0403* (2013.01); *B05B 12/08* (2013.01); *A63J 5/025* (2013.01); *F41H 9/06* (2013.01); *G08B 15/02* (2013.01)

(58) Field of Classification Search
CPC ......... B05B 9/002; B05B 9/0403; B05B 9/01; B05B 12/08; A63J 5/025; F41H 9/06; G08B 15/02; F22B 1/282
See application file for complete search history.

(56) References Cited

U.S. PATENT DOCUMENTS

| | | | | |
|---|---|---|---|---|
| 3,349,042 A * | 10/1967 | Andrews | B01F 23/21 222/335 |
| 2023/0149957 A1 * | 5/2023 | Ziemkowski | B05B 7/1606 239/13 |
| 2023/0364628 A1 * | 11/2023 | Foti | B05B 15/62 |

* cited by examiner

*Primary Examiner* — Shawntina T Fuqua
(74) *Attorney, Agent, or Firm* — Flener IP & Business Law; Zareefa B. Flener

(57) ABSTRACT

A fog-generating system (1) is described, comprising: a tank (5) containing fog-generating fluid; a pump (3) connected to the tank (5) to withdraw the fog-generating fluid therefrom; a serpentine (2) connected to the pump (3) to receive the fog-generating fluid pumped by the pump (3), the serpentine (2) being divided into a first section (A) connected to the pump (3) and a second section (B) connected to the first section (A) and designed to emit dry fog (7) as output; a battery (6) connected to the serpentine (2) to pass electric current inside the serpentine (2) and to supply the pump (3); a differential amplifier (11) connected to the second section (B); and a threshold comparator (13) which, upon exceeding a certain voltage, a stop index of the serpentine (2) in the second section (B), breaks the supply to the pump (3).

5 Claims, 3 Drawing Sheets

FOG-GENERATING SYSTEM EQUIPPED WITH SAFETY AND REGULATING DEVICES OF THE FLOW-RATE OF ITS FOG-GENERATING FLUID

The present invention refers to a fog-generating system equipped with safety and regulating devices of the flow-rate of its fog-generating fluid. In particular, the present invention refers to a fog-generating system with null absorption in stand-by, equipped with passive safety systems or with discrete electronics, to a fog-generating system with passive self-regulation of the flow-rate of its fog-generating fluid, and to a fog-generating system with intrinsic safety against the risk of self-ignition of the fluid in case of failure.

Fog-generating apparatuses (operating as anti-theft devices or for shows, screening, defence, etc.) are typically composed of a tank (pressurized or not, in this latter case being necessarily equipped with at least one pump) and a heat exchanger designed to take to its vapour phase the fog-generating liquid contained in the tank.

The exchange surface of the heat exchanger is dimensioned according to the power required for emitting fog.

In the particular case of anti-theft apparatuses, it is important that the apparatus goes on operating even for some hours, should the electric mains supply be missing.

In order to do so, currently the exchanger is dimensioned with a high thermal mass which is thermally insulated from the environment.

Obviously the "capacity/resistance" system that is obtained with such configuration has a well defined time constant that, starting from the time in which the electric supply is interrupted, decays the possible system performances from its maximum to zero.

It is also obvious that, under stand-by conditions wherein the apparatus stays for the vast majority of its working life, there is a self-consumption equal to the unavoidable thermal losses of its insulation, which, in real cases—even with the best existing insulations and for a machine capable of protecting about 300 square meters (as reference)—range from 30 W to 120 W according to the manufacturer.

This self-consumption, which apparently seems negligible (at least in the best cases), actually is full of economic and practical consequences.

First of all, an absorption of only 30 W (in the best case) if turned-on for the whole year, as happens, generates an energy consumption of 260 kWh, which, at the current mean cost of about 0.36€/kWh, gives about 100 €—approximately 25% of the sales cost of the produced machine.

On a cheaper machine, which however absorbs 80 W (typical case), the costs move to 250 €/year.

Secondly, the latency time without electric supply is necessarily limited, and the risk of theft with "preventive disconnection" is not wholly removed, if it is not possible to timely intervene in case of lack of current.

Object of the present invention is solving the above prior art problems, by providing a fog-generating system which stores energy instead of a thermal mass to be kept hot and thermally insulated (with the above mentioned consequences), by accumulating energy in an electro-chemical accumulator (preferably made of acid lead) and by quickly extracting it upon use.

In order to quickly perform such extraction —critical and mandatory feature for an anti-theft application—it is necessary to minimize the thermal mass of the exchanger: in fact, the first operation to be made is taking the exchanger in temperature before inserting the fog-generating fluid therein.

It is clear that the time constant of the system, when starting up, is directly proportional to the thermal mass/inserted power ratio.

The present invention will deal with the technique to keep this ratio low, with the technique to transfer heat efficiently and with how to keep the system temperature controlled.

The above and other objects and advantages of the invention, as will appear from the following description, are obtained with a fog-generating system as claimed in claim 1. Preferred embodiments and non-trivial variations of the present invention are the subject matter of the dependent claims.

It is intended that all enclosed claims are an integral part of the present description.

The present invention will be better described by some preferred embodiments thereof, provided as a non-limiting example, with reference to the enclosed drawings, in which.

With reference to the Figures, preferred embodiments of the present invention are shown and described. It will be immediately obvious that numerous variations and modifications (for example related to shape, sizes, arrangements and parts with equivalent functionality) can be made to what is described, without departing from the scope of the invention as contained in the enclosed claims.

Figure 1:
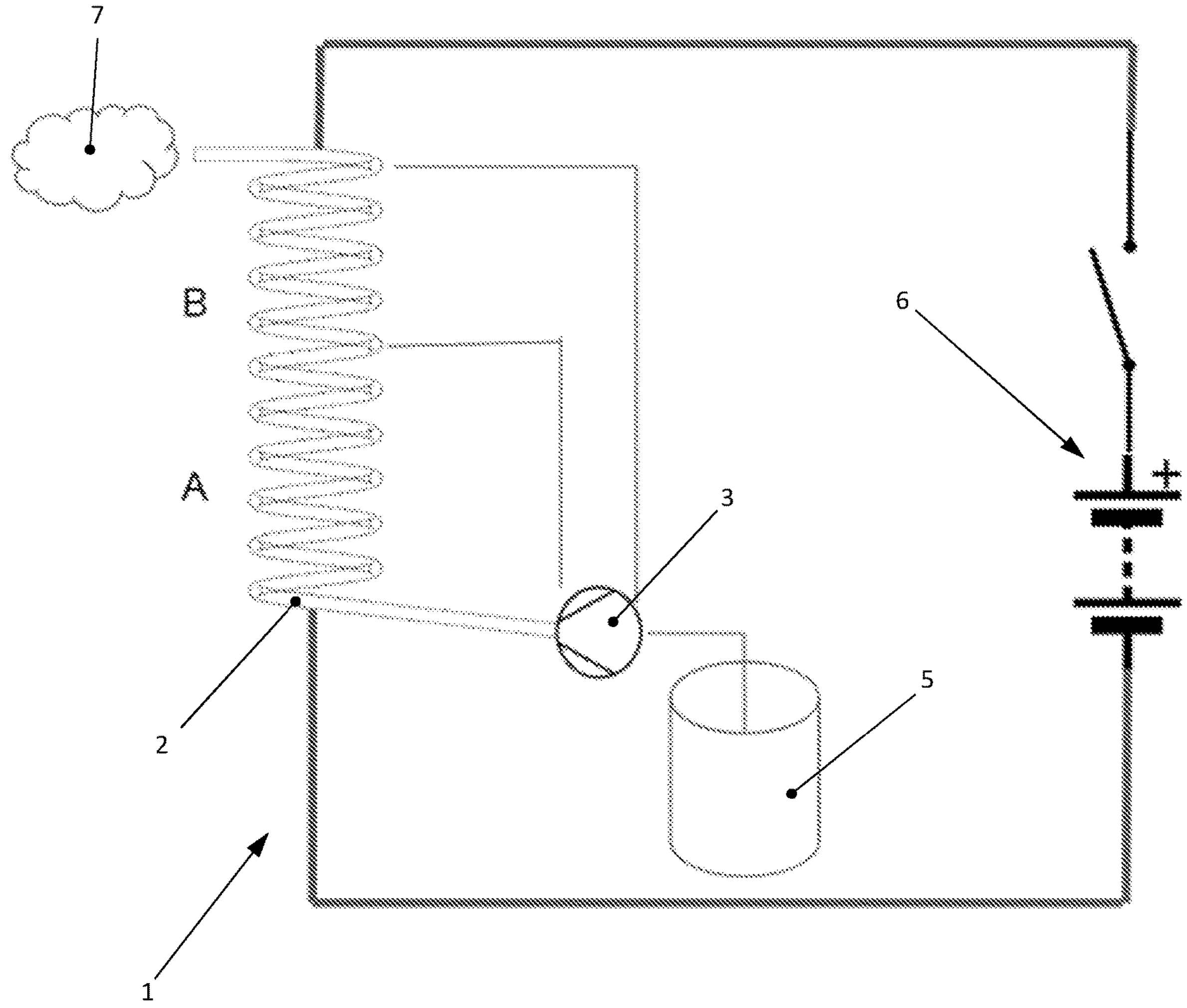
FIG. 1 is a schematic view of a first preferred embodiment of the fog-generating system according to the present invention.

With reference to FIG. 1, the fog-generating system 1 of the present invention, in its simpler form, substantially comprises at least one serpentine 2 made of conducting (resistive) material, in which electric current from at least one battery 6 is made pass.

Contrary to other devices in which the current is controlled in order to keep the temperature of the serpentine 2 constant or at least within safety limits through external thermometers, namely a volt-ampere metrical measure of the resistance of the serpentine itself (index of its temperature), but above all through software- or firmware-based digital systems (which unavoidably imply a risk of computer error), the system can be wholly passive or, at most, controlled by basic electronics without computers.

As shown in FIG. 1, a fog-generating fluid (not shown) is pushed into the serpentine 2 through at least one pump 3, which withdraws it from at least one tank 5 which contains the fog-generating fluid.

The supply of the pump 3 is taken from a resistive divider obtained from a second section B of the serpentine 2—typically made of austenitic stainless steel, but which can be made of any metallic material with a sufficiently high melting point.

Upon supplying the serpentine 2 through the contactor of the battery 6—obviously an example, which can be replaced by SSR systems, MOSFETs, etc.—the pump 3 is directly supplied.

Till the serpentine 2 remains dry—and this occurs till the pump 3 is triggered and increases its pressures (approximately in one or two seconds), the serpentine 2 is uniformly heated and, with the same law, its resistance proportionally increases.

When the fog-generating fluid gets in contact with a first section A, its heating and the following status change prevent the first section A from being overheated, limiting its resistance increase.

The second section B, instead, is affected only by the vapour phase, which nominally removes a lower amount of heat, and it is be heated more, making the voltage increase at its terminals.

Since the power absorbed by the pump 3 is negligible with respect to the power of the serpentine 2, the pump 3 will have a supply voltage as high as much the second section B (over-heater) is "dry", and consequently increases the flow-rate till a balance point is found between temperature distribution and flow-rate.

With a suitable balancing the system 1 will find the operating point that allows it to emit dry fog 7, self-regulating itself independently from the external temperature, from the fluid temperature and partly from the charge status of the battery 6.

Figure 2:
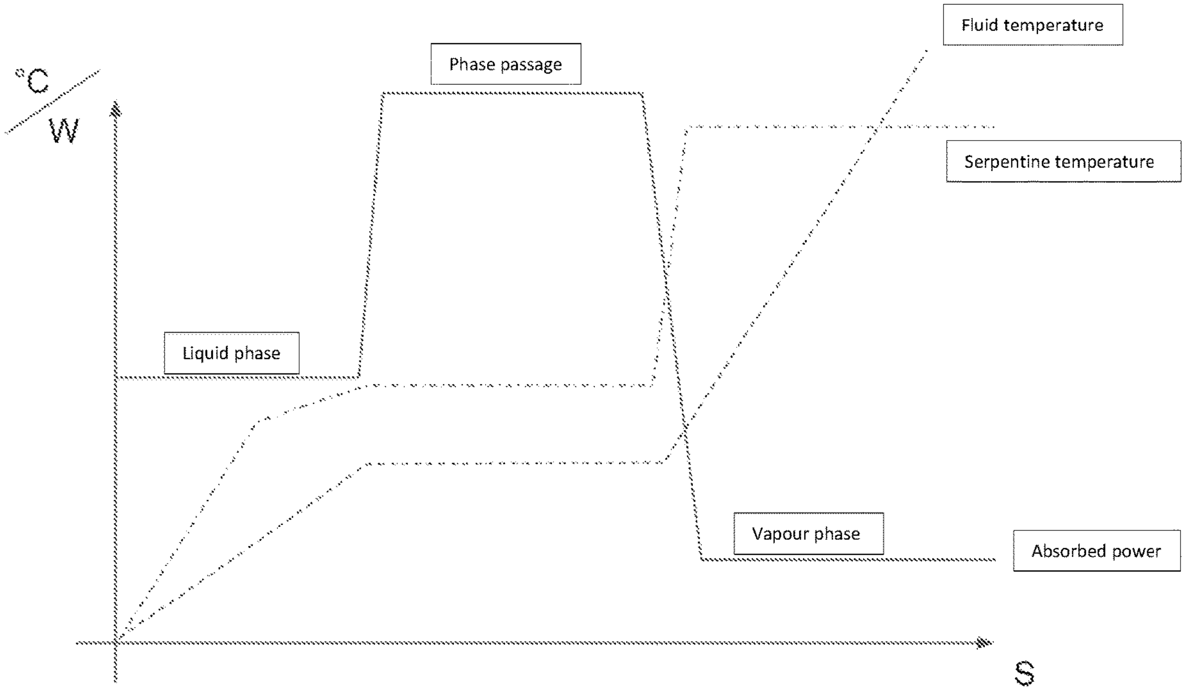
FIG. 2 is a graph which shows the operation of the fog-generating system according to the present invention.

With reference to the previous diagram of FIG. 1 and to the graph of FIG. 2, the self-regulation principle has been described: it is now necessary to examine, for more completeness and operating safety, what can happen in the extreme cases for safety, and the suitable methods for safety keeping.

As first operating case, should the fog-generating liquid run out, in addition to the end of the delivery, an excessive overheating of the serpentine 2 could occur due to lack of cooling.

In this case, the temperature could increase till it causes the melting of a section of the serpentine 2, which, being protected by a fireproof sheath, would not cause other dangers, while the machine would stop.

As second operating case, the serpentine 2 could fail due to construction defects, typically in the second section B which is the hotter one.

In this case, the pump 3 would be supplied at the maximum power, delivering the fluid in the interruption.

Being the fluid inflammable, if taken to its ignition temperature, this could cause a fire principle.

In order to solve this, the fog-generating system 1 of the present invention can therefore be equipped with a passive protection.

For such purpose, the serpentine 2 is inserted in an inert material and inside an enough refractory container, which insulates it from the atmospheric oxygen.

Since the contact with the oxidising material is now lost, the flame cannot be triggered, nor be propagated.

Upon interrupting the serpentine 2, the triggering is also lost, preventing new switch-on operations.

If the serpentine 2 is interrupted in the first section A, everything stops, if it is interrupted in the second section B, the pump 3 goes on entering fluid, which soaks the inert material, cooling it.

Figure 3:
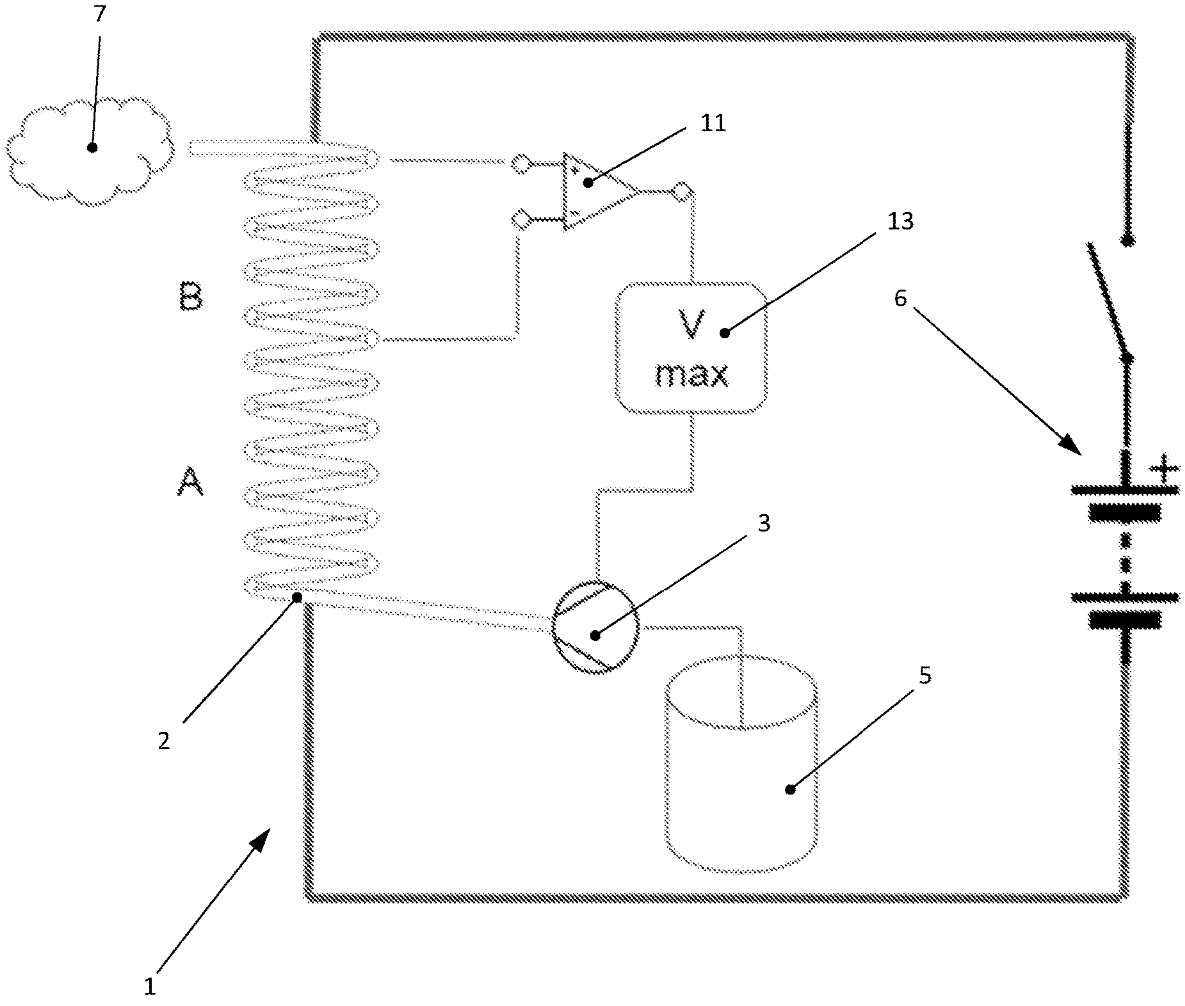
FIG. 3 is a schematic view of a second preferred embodiment of the fog-generating system according to the present invention.

As alternative, the fog-generating system 1 of the present invention can be equipped with an active protection, as can be better seen in FIG. 3.

For such purpose, with the introduction of two components made of discrete electronics, described below, the last possible inconveniences are solved.

The first component stage is at least one differential amplifier 11 operatively connected to the second section B of the serpentine 2, which, by taking the control signal from the serpentine 2, adapts it (amplifying or reducing it) to the correct supply of the pump 3.

The second component stage is at least one threshold comparator 13 operatively connected to the differential amplifier 11 and to the pump 3, which, upon exceeding a certain voltage (index of the interruption of the serpentine 2 in the second section B), breaks the supply to the pump 3.

In this way, any risk of turning-on is removed and the feedback control is improved, without introducing digital elements controlled by computer resources subjected to hidden software errors.

The invention claimed is:

1. A fog-generating system (1) comprising:

at least one tank (5) containing fog-generating fluid;

at least one pump (3) connected to said at least one tank (5) and designed to withdraw said fog generating fluid therefrom;

at least one serpentine (2) connected to said at least one pump (3) and designed to receive said fog-generating fluid pumped by said pump (3), said serpentine (2) being divided into a first section (A) connected to said pump (3) and a second section (B) connected to said first section (A) and designed to emit dry fog (7) as output; and at least one battery (6) operatively connected to said at least one serpentine (2) and designed to pass electric current inside said serpentine (2) and to supply said pump (3), wherein a supply of said pump (3) is taken from a resistive divider obtained from said second section (B) of the serpentine (2), and, till the serpentine (2) remains dry, it is uniformly heated and its resistance proportionally increases, while, when the fog-generating fluid gets in contact with said first section (A), its heating and the following status change prevent the first section (A) from being overheated, limiting its resistance increase, and the second section (B), instead, is affected only by its vapour phase, and will be heated more, increasing the voltage at its terminals, so that the pump (3) has a supply voltage as higher as the second section (B) is more "dry", and consequently increases the flow-rate till a balance point is found between temperature distribution and flow-rate.

2. The fog-generating system (1) according to claim 1, further comprising:

at least one differential amplifier (11) operatively connected to said second section (B), said differential amplifier (11) taking a control signal from said serpentine (2) and adapting it, through amplification or reduction, to a supply of said pump (3); and at least one threshold comparator (13) operatively connected to said differential amplifier (11) and to said pump (3), said threshold comparator (13), upon exceeding a certain voltage, which is a stop index of said serpentine (2) in the second section (B), being designed to break the supply to the pump (3).

3. The fog-generating system (1) according to claim 1, wherein said serpentine (2) is immersed in an inert material and inside a refractory container, which insulates it from atmospheric oxygen, with a flame retardant function.

4. The fog-generating system (1) according to claim 1, wherein said serpentine (2) is made of conductive material.

5. The fog-generating system (1) according to claim 1, wherein said divider obtained from said second section (B) is made of austenitic stainless steel, or of any metallic material with a sufficiently high melting point.

* * * * *